(12) United States Patent
Hioki et al.

(10) Patent No.: US 10,752,211 B2
(45) Date of Patent: Aug. 25, 2020

(54) KEY MANAGEMENT DEVICE AND METHOD FOR LENDING A VEHICLE

(71) Applicant: TOYOTA JIDOSHA KABUSHIKI KAISHA, Toyota-shi (JP)

(72) Inventors: Jun Hioki, Nagakute (JP); Hiroshi Igata, Yokohama (JP); Megumi Amano, Toyota (JP); Masaki Ito, Toyota (JP); Tomoaki Miyazawa, Nagoya (JP); Yuichiro Haruna, Oyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/209,404

(22) Filed: Dec. 4, 2018

(65) Prior Publication Data
US 2019/0184939 A1  Jun. 20, 2019

(30) Foreign Application Priority Data

Dec. 20, 2017  (JP) ................................ 2017-244293

(51) Int. Cl.
| G05B 19/00 | (2006.01) |
| B60R 25/24 | (2013.01) |
| G06Q 30/06 | (2012.01) |
| G07C 9/00  | (2020.01) |
| H04W 64/00 | (2009.01) |
| G06Q 50/30 | (2012.01) |
| H04W 4/02  | (2018.01) |

(52) U.S. Cl.
CPC ....... *B60R 25/241* (2013.01); *G06Q 30/0645* (2013.01); *G06Q 50/30* (2013.01); *G07C 9/00309* (2013.01); *H04W 4/02* (2013.01); *H04W 64/003* (2013.01); *G07C 2009/00468* (2013.01)

(58) Field of Classification Search
None
See application file for complete search history.

(56) References Cited

U.S. PATENT DOCUMENTS

| 2010/0211252 | A1  | 8/2010  | Wang |
| 2011/0195699 | A1* | 8/2011  | Tadayon ............... H04B 5/0062 455/418 |
| 2011/0257880 | A1  | 10/2011 | Watanabe et al. |
| 2012/0001741 | A1  | 1/2012  | Watanabe |
| 2016/0140649 | A1* | 5/2016  | Kleve ................ G06Q 30/0645 705/307 |

FOREIGN PATENT DOCUMENTS

| JP | 2004-518212 A | 6/2004 |
| JP | 2009-107531 A | 5/2009 |
| JP | 2010-151564 A | 7/2010 |

(Continued)

*Primary Examiner* — Adolf Dsouza
(74) *Attorney, Agent, or Firm* — Oblon, McClelland, Maier & Neustadt, L.L.P.

(57) ABSTRACT

A key management device includes a server configured to issue an electronic key of a vehicle to a user device, configured to acquire position information of the vehicle, and configured to invalidate the electronic key issued to the user device when a determination is made from the position information of the vehicle that the vehicle is present at a predetermined position.

5 Claims, 4 Drawing Sheets

(56) References Cited

FOREIGN PATENT DOCUMENTS

| | | |
|---|---|---|
| JP | 2010-151565 A | 7/2010 |
| JP | 2010-151600 A | 7/2010 |
| JP | 2010-151735 A | 7/2010 |
| JP | 2010-169474 A | 8/2010 |
| JP | 2010-175451 A | 8/2010 |
| JP | 2010-185698 A | 8/2010 |
| JP | 2010-185699 A | 8/2010 |
| JP | 2010-223879 A | 10/2010 |
| JP | 2010-223880 A | 10/2010 |
| JP | 2010-256272 A | 11/2010 |
| JP | 2011-85478 A | 4/2011 |
| JP | 2014-54902 | 3/2014 |
| WO | WO 02/058031 A1 | 7/2002 |

* cited by examiner

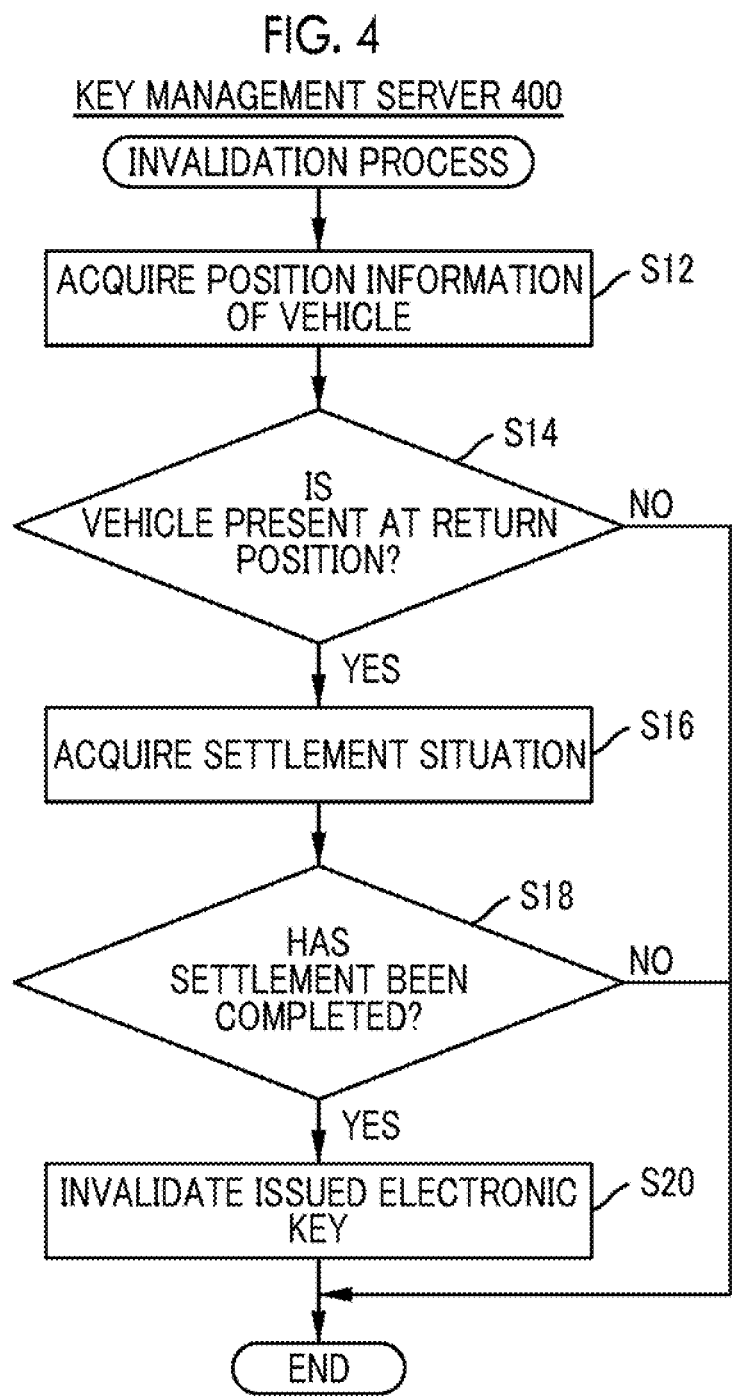

KEY MANAGEMENT DEVICE AND METHOD FOR LENDING A VEHICLE

INCORPORATION BY REFERENCE

The disclosure of Japanese Patent Application No. 2017-244293 filed on Dec. 20, 2017 including the specification, drawings and abstract is incorporated herein by reference in its entirety.

BACKGROUND

1. Technical Field

The present disclosure relates to a key management device, a vehicle rental system, a key management method, and a non-transitory computer-readable recording medium storing a program for causing a computer to execute a key management method that is performed by the key management device.

2. Description of Related Art

A technology for enabling use of a mobile terminal such as a smartphone as a key of a vehicle is known (Japanese Unexamined Patent Application Publication No. 2014-054902 (JP 2014-054902 A)). Using this technology, a vehicle can be lent without a key of the vehicle being directly delivered. For example, when a maintenance dealer is requested for maintenance of the vehicle, the maintenance dealer can take over the vehicle and perform maintenance even when an owner is absent at home.

SUMMARY

When an electronic key (electronic key) is issued as described above, an expiration date may be set. Since a period of time needed for maintenance work is unclear, the expiration date is set with a margin. However, for the owner, it is desirable for the use of the electronic key to be disabled immediately when maintenance work is completed and the electronic key becomes not needed.

Although the rental to the maintenance dealer has been described above, it is desirable for the use of the electronic key to be disabled immediately after the purpose of rental is achieved irrespective of use of the rental.

In order to disable use of the electronic key, it is desirable for the use of the electronic key to be automatically disabled without requiring a particular manipulation of the user or the owner.

The present disclosure provides a key management device that prevents automatic use of an electronic key that is no longer needed, a vehicle rental system, a key management method, and a non-transitory computer-readable recording medium storing a program for causing a computer to execute a key management method that is performed by the key management device.

A first aspect of the present disclosure relates to a key management device. The key management device includes a server configured to issue an electronic key of a vehicle to a user device, acquire position information of the vehicle, and invalidate the electronic key issued to the user device when a determination is made from the position information of the vehicle that the vehicle is present at a predetermined position.

Here, the "predetermined position" may be a predetermined return position of the vehicle. The position does not necessarily indicate one point, and may be a region having an area designated explicitly or implicitly.

"Invalidate the electronic key issued to the user device when a determination is made that the vehicle is present at a predetermined position" means that the vehicle may be or may not be present at the predetermined position at the time of invalidating the electronic key. That is, the above configuration also includes invalidating the electronic key regardless of a position of the vehicle at a current point in time after a determination is made that the vehicle is present at the predetermined position.

The invalidation of the issued electronic key indicates a process of disabling control of the vehicle using the issued electronic key. The process of invalidating the electronic key includes, for example, deletion of the electronic key from the user device (including addition of an invalidation flag or a deletion flag), a request for prohibition of transmission of the electronic key from the user device to the vehicle, and a request for rejection of reception of the electronic key at the vehicle.

According to the key management device of the first aspect of the present disclosure, it is possible to automatically invalidate the electronic key on condition that the user has returned the vehicle to the return position. When the vehicle returns, it is possible to estimate that further use is not needed. Therefore, it is possible to provide safety and security for the owner by invalidating the issued electronic key.

In the key management device according to the first aspect of the present disclosure, the electronic key may be invalidated, further, on condition that a predetermined process has been completed by a user.

That is, in the key management device according to the first aspect of the present disclosure, the server may be configured to invalidate the electronic key issued to the user device on condition that the vehicle is present at a predetermined position and that a predetermined process by a user of the user device has been completed.

In the key management device according to the first aspect of the present disclosure, the server may be configured to acquire information indicating whether or not the predetermined process has been completed from the user device or the external server.

In the key management device according to the first aspect of the present disclosure, the predetermined process may be at least one of a settlement process, a vehicle return process, and arrival at a destination.

In the key management device according to the first aspect of the present disclosure, the predetermined position may be a predetermined return position of the vehicle.

In the key management device according to the first aspect of the present disclosure, the server may be configured to invalidate the electronic key issued to the user device on condition that an engine of the vehicle is turned off.

In the key management device according to the first aspect of the present disclosure, the server may be configured to invalidate the electronic key issued to the user device on condition that the user device is separated by a predetermined distance or more from the vehicle.

A second aspect of the present disclosure relates to a vehicle rental system including a vehicle, a user device, and a key management device that issues an electronic key of the vehicle to the user device. The key management device includes a server. The server is configured to issue the electronic key of the vehicle to the user device, acquire position information of the vehicle, and invalidates the electronic key issued to the user device when a determination is made from the position information of the vehicle that the vehicle is present at a predetermined position.

A third aspect of the present disclosure relates to a key management method being performed by a key management device including a server. The key management method includes issuing, by the server, an electronic key of a vehicle to a user device; acquiring, by the server, position information of the vehicle; and invalidating, by the server, the electronic key issued to the user device when a determination is made from the position information of the vehicle that the vehicle is present at a predetermined position.

A fourth aspect of the present disclosure relates to a non-transitory computer-readable recording medium storing a program for causing a computer to execute a key management method being performed by a key management device. The key management device includes a server, and the program causes a control process of the key management device to be executed. The control process includes issuing, by the server, an electronic key of a vehicle to a user device, acquiring, by the server, position information of the vehicle, and invalidating, by the server, the electronic key issued to the user device when a determination is made from the position information of the vehicle that the vehicle is present at a predetermined position.

According to the aspect of the present disclosure, it is possible to prevent automatic use of an electronic key that is no longer needed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a flowchart showing a flow of a key invalidation process in a key management server according to the embodiment.

DETAILED DESCRIPTION OF EMBODIMENTS

System Overview

An embodiment is a vehicle rental system that lends a vehicle by issuing an electronic key to a mobile terminal such as a smartphone. In the embodiment, it is assumed that an electronic key is issued to a maintenance dealer such as a car dealer and a vehicle is lent.

Figure 1:
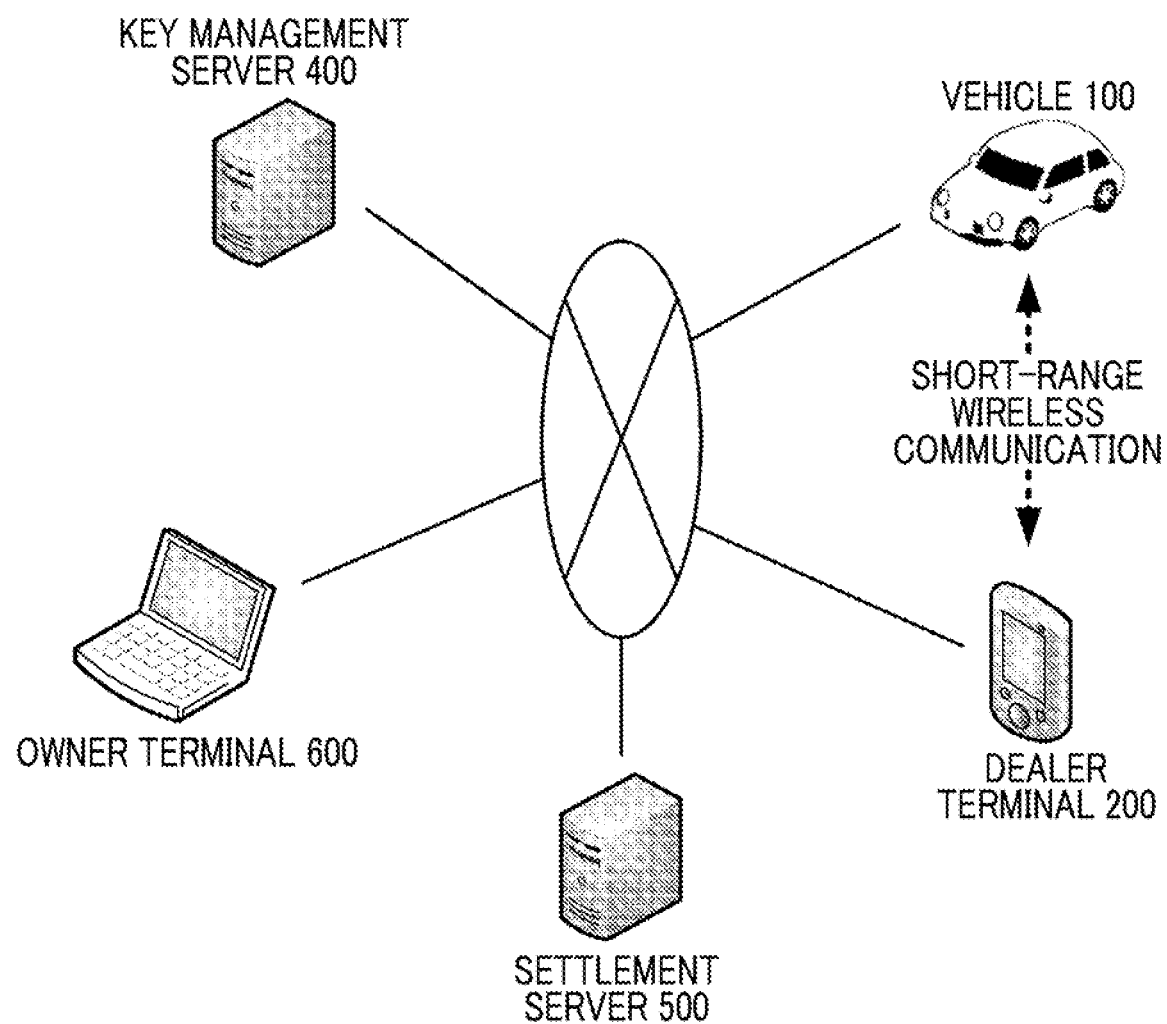
FIG. 1 is a system overview diagram of a vehicle rental system according to an embodiment.

FIG. 1 is a diagram illustrating a system overview of a vehicle rental system according to the embodiment. The vehicle rental system according to the embodiment includes a vehicle 100, a dealer terminal 200, a key management server 400, a settlement server 500, and an owner terminal 600.

Figure 2:
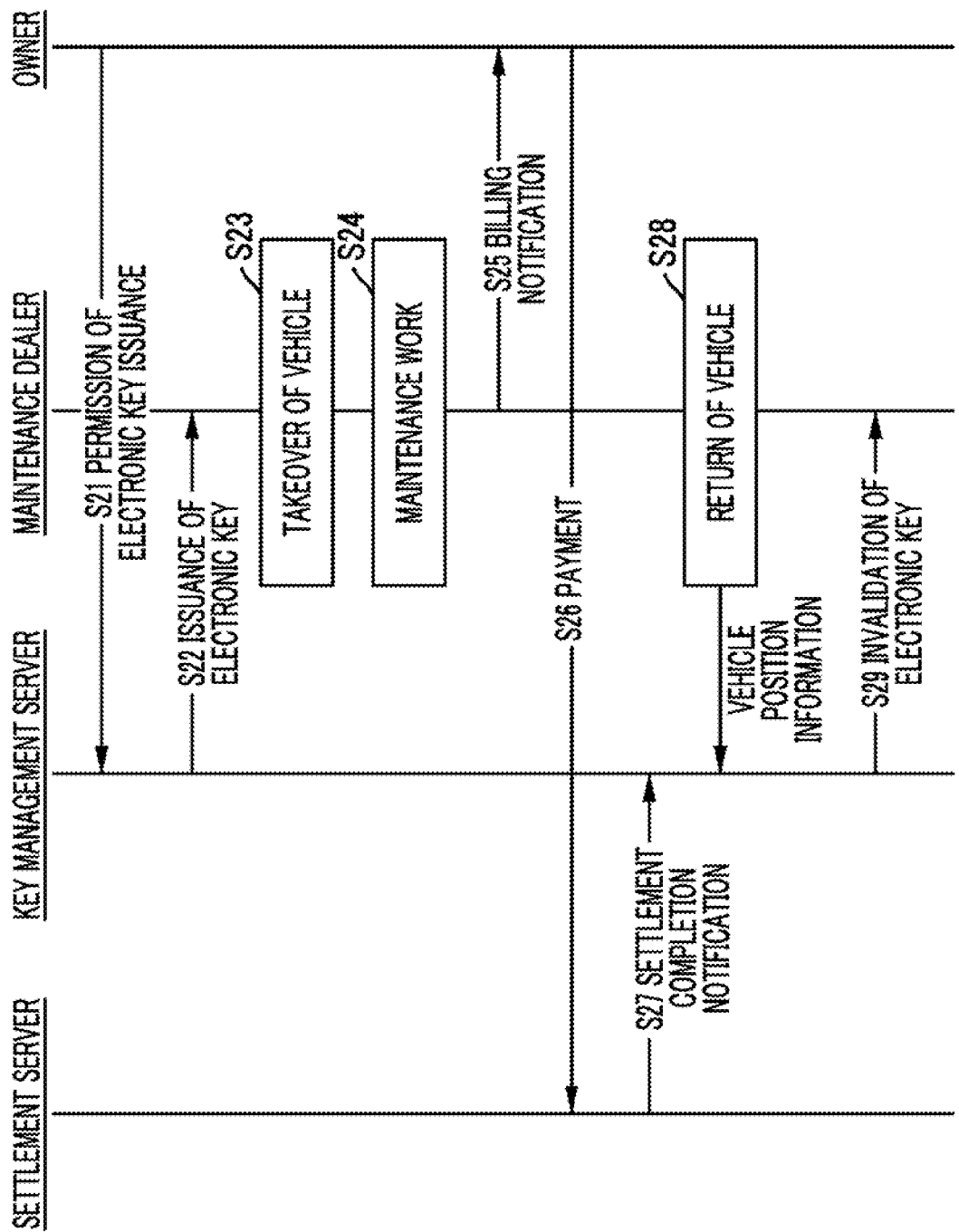
FIG. 2 is a diagram illustrating a flow of a process when the vehicle rental system according to the embodiment has been applied to a maintenance request.

FIG. 2 is a diagram illustrating a flow when an owner of a vehicle 100 requests a maintenance dealer to perform maintenance in the embodiment.

First, in step S21, the owner of the vehicle 100 permits the key management server 400 to issue an electronic key to the maintenance dealer. This process may be integrated with a maintenance request to the maintenance dealer.

In step S22, the key management server 400 issues the electronic key to the dealer terminal 200 owned by the maintenance dealer. In step S23, the maintenance dealer takes over the vehicle to a house of the owner (or a storage position of the vehicle 100), starts an engine of the vehicle 100 using the electronic key of the dealer terminal 200 to move the vehicle 100 to a maintenance center. Thus, by using the electronic key, the owner can deliver the vehicle without seeing the maintenance dealer.

The maintenance dealer performs a maintenance work in step S24, and executes a charging process when the work is completed in step S25. In step S26, the owner transmits settlement information to the settlement server 500 and settles a bill. When the settlement is completed, the settlement server 500 transmits settlement completion to the key management server 400 in step S27.

In step S28, the maintenance dealer drives the vehicle 100 to move the vehicle to the house of the owner (or another return position). The vehicle 100 regularly transmits position information to the key management server 400, and the key management server 400 can ascertain a position of the vehicle.

In step S29, the key management server 400 invalidates the electronic key issued in step S22 on condition that the settlement of billing related to the maintenance has been completed and the vehicle 100 is located in a predetermined return position.

Thus, the key management server 400 checks whether or not both the settlement and the return of the vehicle are completed and invalidates the issued electronic key when both conditions are satisfied. Accordingly, it is possible to provide a service that is safe and secure for the owner. Since the owner or maintenance dealer does not need to perform a particular manipulation for invalidation of the key, convenience for the user is also high.

In FIG. 2, an order of the processes of steps S25 to S28 is not particularly limited, and the order may be appropriately changed.

Functional Configuration

Figure 3:
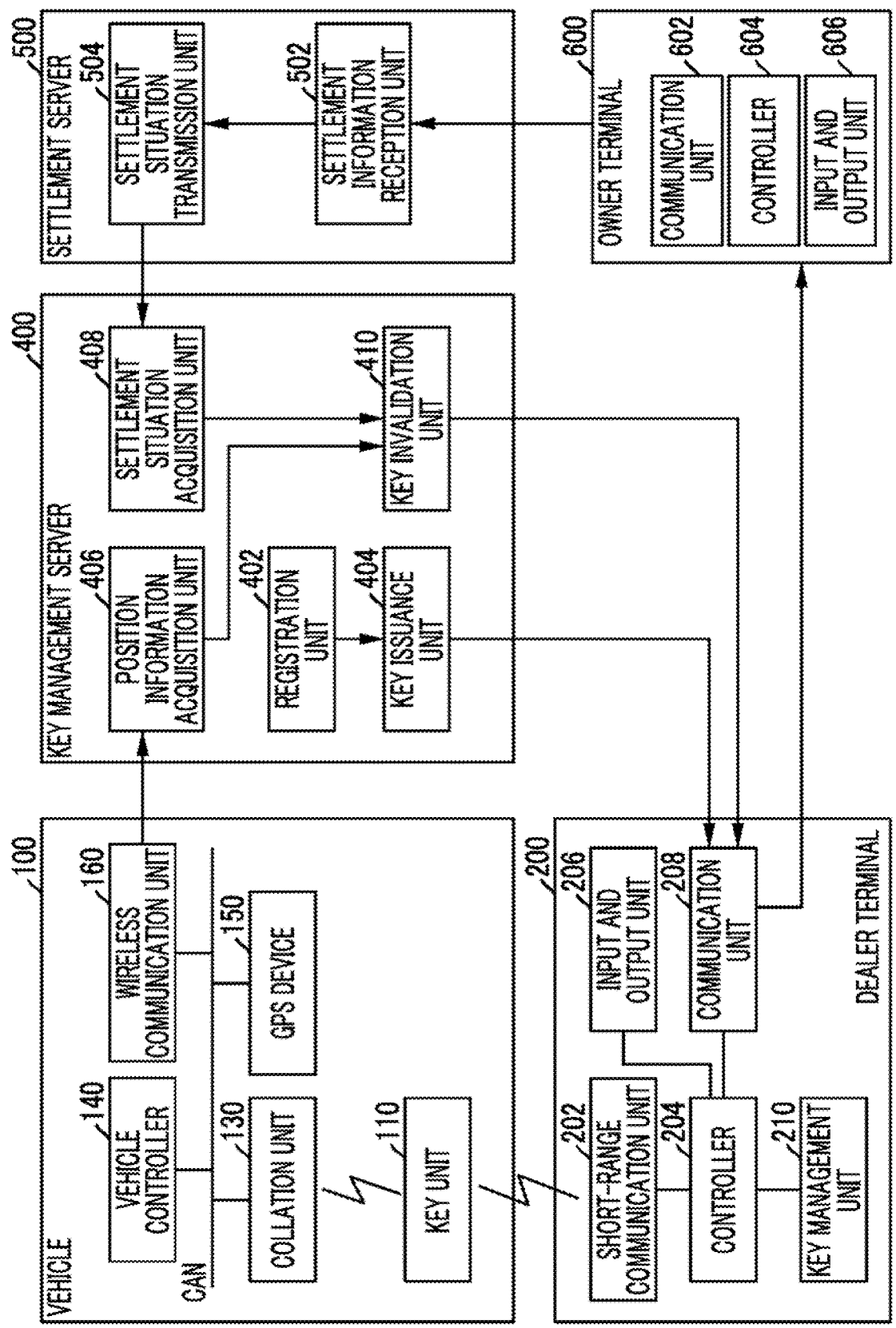
FIG. 3 is a block diagram schematically illustrating an example of components included in the vehicle rental system.

FIG. 3 is a functional block diagram of each device constituting the vehicle rental system according to the embodiment.

Vehicle 100

The vehicle 100 includes a key unit 110, a collation unit 130, a vehicle controller 140, a global positioning system (GPS) device 150, and a wireless communication unit 160. The collation unit 130, the vehicle controller 140, the GPS device 150, and the wireless communication unit 160 are connected in a wired manner by a vehicle network such as a controller area network (CAN), and the key unit 110 is connected to the collation unit 130 through wireless communication.

The key unit 110 includes a wireless interface that is the same as that of a smart key (a mobile device of a smart entry system), and can perform locking and unlocking of the vehicle or other vehicle manipulations without using a physical key by communicating with the collation unit 130. The key unit 110 performs wireless communication with the dealer terminal 200 and determines whether or not the key unit 110 serves as a key of the vehicle 100 (a vehicle manipulation device) based on a result of authenticating the dealer terminal 200. That is, the user of the system can perform locking and unlocking of the vehicle or other vehicle manipulations by manipulating the dealer terminal 200 from the outside of the vehicle 100.

The key unit 110 performs wireless communication with the dealer terminal 200 using a Bluetooth (registered trademark) Low Energy standard (hereinafter referred to as BLE). A wireless communication standard such as Near Field Communication (NFC), Ultra-wideband (UWB), or WiFi (registered trademark) may be used. The key unit 110 receives electronic key data from the dealer terminal 200, and transmits a key ID to the collation unit 130 when authentication thereof is successful. It is assumed that the key ID has been stored as unique authentication information in the key unit 110 and a process for registration in the collation unit 130 has been performed in advance.

The collation unit 130 is connected to the key unit 110 through wireless communication. A wireless communication standard is not particularly limited, but in the embodiment, communication from the collation unit 130 to the key unit 110 is performed using radio waves in a low frequency (LF) band, and communication from the key unit 110 to the collation unit 130 is performed using radio waves in a radio frequency (RF) band. The collation unit 130 regularly transmits a polling signal in the LF band. The key unit 110 transmits a key ID in response to the polling signal. The collation unit 130 determines whether or not the received key ID matches a registered key ID. When the IDs match, the collation unit 130 notifies the vehicle controller 140 that the received key ID matches the registered key ID, making it possible to cause the vehicle to perform a predetermined operation.

The vehicle controller 140 is a functional unit that controls the vehicle 100. Control of the vehicle 100 includes on/off of an engine, locking and unlocking or opening and closing of doors, but the present disclosure is not limited thereto.

The GPS device 150 acquires position information by receiving the GPS satellite signal. As long as the position information can be acquired, the vehicle 100 may use a positioning device based on a Global Navigation Satellite System (GNSS) other than the GPS or may use a positioning device based on base station positioning.

The wireless communication unit 160 is a communication unit for connecting the vehicle 100 to a network. In the embodiment, the wireless communication unit 160 can perform communication with another device (for example, the key management server 400) via the network using a mobile communication service such as 3G (3 Generation) or Long Term Evolution (LTE).

The vehicle 100 transmits the position information acquired by the GPS device 150 to the key management server 400 via the wireless communication unit 160. Acquisition and transmission of position information are repeatedly executed at predetermined intervals. In addition to the position information, the vehicle 100 may transmit information acquired from an accelerator sensor, a steering angle sensor, an azimuth sensor, an engine control device, a light control device, a wiper control device, or the like to the key management server 400.

Dealer Terminal 200

The dealer terminal 200 will be described. The dealer terminal 200 is a device that is used by the user. Therefore, in the present specification, the dealer terminal 200 may also be referred to as a user device.

The dealer terminal 200 is a small computer such as a wearable computer, such as a smartphone, a mobile phone, a tablet terminal, a personal digital assistant, or a smart watch. The dealer terminal 200 includes a communication unit 202, a controller 204, an input and output unit 206, a communication unit 208, and a key management unit 210.

The communication unit 202 is means for performing wireless communication with the key unit 110. As described above, BLE communication is used in the embodiment. The controller 204 is a microprocessor and controls the entire device by executing a program stored in a memory. The input and output unit 206 is a touch screen and receives an output of an image or a touch input from the user. The communication unit 208 is a communication unit for connecting the dealer terminal 200 to the network, and uses a mobile communication service such as 3G or LTE. The key management unit 210 stores the electronic key data issued from the key management server.

The user of the dealer terminal 200 manipulates the input and output unit 206 to receive the electronic key data of the vehicle 100 from the key management server 400. The electronic key data transmitted from the key management server 400 is stored in the key management unit 210. When the user of the dealer terminal 200 uses the vehicle 100, the user performs a predetermined input manipulation in the vicinity of the vehicle 100 (within a communication range of the wireless communication) and transmits the electronic key data to the key unit 110 of the vehicle 100. Accordingly, the user can use the vehicle 100.

When the maintenance is completed, the user of the dealer terminal 200 inputs that the maintenance is completed. Accordingly, a notification including information on the completion of the maintenance and a billing is transmitted to the owner terminal 600 directly or indirectly via another server.

Key Management Server 400

The key management server (a key management device) 400 will be described. The key management server 400 is a computer including a microprocessor, a storage device, an input and output device, and a communication device, and the following functions are realized by the microprocessor executing a program. However, some or all of the functions may be realized by a hardware circuit such as an application specific integrated circuit (ASIC) or a field programmable gate array (FPGA). The key management server 400 does not have to be realized by one computer, but may be realized by cooperation of a plurality of computers.

The key management server 400 includes a registration unit 402, a key issuance unit 404, a position information acquisition unit 406, a settlement situation acquisition unit 408, and a key invalidation unit 410.

The registration unit 402 is a functional unit that registers an issuance target of the electronic key of the vehicle 100. The registration unit 402 registers, for example, an issuance target of the electronic key based on an instruction from the owner terminal 600. The registration unit 402 may register an individual who is an issuance target of the electronic key or may register a terminal that is an issuance target of the electronic key. The registration unit 402 may further receive and register information on the return position when the vehicle 100 returns or information on an expiration period of the electronic key to be issued.

The key issuance unit 404 is a functional unit that issues the electronic key of the vehicle 100 to the user device based on an electronic key issuance request from the user device. The key issuance unit 404 determines whether or not the electronic key issuance request is transmitted from the issuance target registered in advance, and performs issuance of the electronic key when the electronic key issuance request is transmitted.

In the embodiment, the electronic key means electronic data that can be used to control the vehicle 100 using the user device when the user device possesses the electronic key.

However, the electronic key can be invalidated, and control of the vehicle 100 cannot be performed with the invalidated electronic key, as will be described below. The electronic key is electronic data. Therefore, in this specification, the electronic key is also referred to as electronic key data, both of which are interchangeable.

The key issuance unit 404 sets an expiration date of the electronic key and issues the electronic key to the user device. The expiration date is preset, for example, at the time of registration via the registration unit 402. The electronic key may include a valid/invalid flag indicating whether the electronic key is valid or invalid.

The position information acquisition unit 406 acquires the position information of the vehicle 100 from the vehicle 100 through wireless communication. The settlement situation acquisition unit 408 acquires a settlement situation of the owner from the settlement server 500 through wireless communication. The position information acquisition unit 406 is an example of first acquisition means and the settlement situation acquisition unit 408 is an example of second acquisition means. In the embodiment, the position information of the vehicle 100 is directly acquired from the vehicle 100. However, the position information acquisition unit 406 may acquire the position information of the vehicle 100 via a device other than the vehicle 100. Similarly, the settlement situation acquisition unit 408 may acquire the settlement situation from a device (for example, another server device or user device) other than the settlement server 500.

The key invalidation unit 410 invalidates the electronic key issued to the dealer terminal 200 on condition that the vehicle 100 is present at the return position (a predetermined position) and a settlement process for billing is completed. A specific scheme of an electronic key invalidation process will be described below. A process of confirming whether or not the above condition is satisfied may be performed at any timing. In the embodiment, the key invalidation unit 410 regularly confirms whether the above condition is satisfied.

Settlement Server 500

The settlement server 500 will be described. Since a hardware configuration of the settlement server 500 is the same as that of the key management server 400, repeated description will be omitted. The settlement server 500 and the key management server 400 may be realized by the same computer.

The settlement server 500 includes a billing information acquisition unit (not illustrated), a settlement information reception unit 502, and a settlement situation transmission unit 504.

The billing information acquisition unit acquires a billing amount or a billing target from the maintenance dealer and stores the billing amount or the billing target. The billing information acquisition unit may electronically transmit a bill to the owner (the billing target). The settlement information reception unit 502 receives the settlement information from the owner terminal 600. The settlement information includes account information, authentication information, payment amount, and the like, and is information with which the billing process can be executed. When the settlement information reception unit 502 receives the settlement information, the settlement server 500 executes a settlement process for the bill. When the settlement process is completed, the settlement situation transmission unit 504 notifies the key management server 400 that settlement has been completed via wireless communication.

Owner Terminal 600

The owner terminal 600 is a terminal (a computer) that is manipulated by the owner of the vehicle 100. The owner terminal may be a mobile computer such as a smartphone or a laptop computer or may be a stationary computer such as a desktop computer. The owner terminal 600 is an ordinary computer, and includes a communication unit 602, a controller 604, and an input and output unit 606. Using the owner terminal 600, the owner can permit the key management server 400 to issue the electronic key to the maintenance dealer or request the settlement server 500 to perform a settlement process.

Process

An electronic key invalidation process of the key management server 400 will be described with reference to FIG. 4. The process illustrated in FIG. 4 is regularly executed by the key management server 400.

In step S12, the key management server 400 acquires the position information of the vehicle 100 via the position information acquisition unit 406. In step S14, the key management server 400 determines whether or not the position of the vehicle 100 is the return position registered in advance. When the position of the vehicle 100 is the return position (YES in S14), the process proceeds to step S16. When the position of the vehicle 100 is not the return position (NO in S14), the process ends.

In step S16, the key management server 400 acquires the settlement situation of the request related to the maintenance of the vehicle 100 from the settlement server 500 via the settlement situation acquisition unit 408. In step S18, the key management server 400 determines whether or not the settlement is completed. When the settlement has been completed (YES in S18), the process proceeds to step S20. When the settlement has not been completed (NO in S18), the process ends.

In step S20, the key management server 400 invalidates the electronic key issued to the dealer terminal 200 via the key invalidation unit 410. Specific content of the electronic key invalidation process is not particularly limited as long as the maintenance dealer is unable to manipulate the vehicle 100 using the dealer terminal 200.

The invalidation of the electronic key can be realized, for example, by the key management server 400 performing the following process.

(1) The dealer terminal 200 is instructed to delete the electronic key data.

(2) The dealer terminal 200 is instructed to set the invalidation flag of the electronic key data. In this case, it is needed for the key management unit 210 to be configured not to transmit the electronic key data with the set invalidation flag to the vehicle 100.

(3) The dealer terminal 200 is instructed to rewrite the expiration date included in the electronic key data to the past date and time.

(4) The electronic key data is invalid and the dealer terminal 200 is instructed not to transmit the key data to the vehicle 100.

(5) The vehicle 100 is instructed not to receive the electronic key data which is invalid. Instead of notification from the key management server 400, a reply may be performed with an indication indicating whether the electronic key data is valid or invalid in response to a request from the vehicle 100.

(6) The vehicle 100 is instructed not to receive the electronic key data from the dealer terminal 200.

The process of the flowchart of FIG. 4 may be appropriately changed. For example, the order of the process of steps S12 to S14 and steps S16 to S18 may be changed.

Advantageous Effects of Embodiment

According to the embodiment, the electronic key issued to the maintenance dealer is automatically invalidated on condition that payment of a maintenance fee is completed and the vehicle has returned to the return position. Therefore, it is possible to provide a service that is safe and secure for the user (owner) of the vehicle rental system of the embodiment. Since it is not needed for the owner or maintenance dealer to perform a particular manipulation for invalidation of the electronic key, convenience is also high.

Modification Example 1

Although the invalidation process illustrated in FIG. 4 has been described as being regularly executed by the key management server 400, the invalidation process may be executed with the completion of the settlement or the notification of the vehicle return as a trigger. In this case, the vehicle 100 or the settlement server 500 voluntarily transmits a vehicle position and a settlement situation to the key management server 400.

Although the determination is made in step S14 whether or not the current position of the vehicle is the return position, a determination may be made whether or not the vehicle has returned to the return position even once even after the electronic key has been issued.

Modification Example 2

In the above description, the electronic key is invalidated on condition that the return of the vehicle and the completion of the settlement are made, but the condition serving as premise of the invalidation may be appropriately determined according to the request of the system. For example, the electronic key may be invalidated solely on condition that the vehicle 100 returns to the return position without including the completion of settlement as the condition. Instead of or in addition to the completion of the settlement, the maintenance dealer notifying of maintenance completion may be adopted as the condition. The vehicle arriving at a predetermined destination may be adopted as the condition. The predetermined destination may be, for example, any position that is registered in advance when issuance of the key is permitted.

In addition to the vehicle 100 returning to the return position, the engine being turned off at the return position may be adopted as the condition. In this case, a configuration in which the vehicle 100 notifies the key management server 400 of information indicating on or off of the engine is adopted. Furthermore, the engine of the vehicle 100 being turned off and the dealer terminal 200 being separated a predetermined distance or more from the vehicle 100 may be adopted as the condition. The predetermined distance may be determined based on the position information of the vehicle 100 and the dealer terminal 200 or may be determined based on a received radio wave intensity between the vehicle 100 and the dealer terminal 200. As an example, the predetermined distance may be defined as a distance at which wireless communication is disabled between the vehicle 100 and the dealer terminal 200, and the vehicle 100 being unable to receive radio waves from the dealer terminal 200 may be adopted as the condition. Furthermore, in addition to the engine being turned off or the dealer terminal 200 being separated by a predetermined distance or more, there then being no control of the vehicle 100 using the dealer terminal 200 for a predetermined period may be adopted as the condition.

Modification Example 3

In the above description, an example in which the vehicle rental system is used for a maintenance request to the maintenance dealer has been described. However, the example of the application of the vehicle rental system is not limited thereto. For example, the above vehicle rental system may be applied to car sharing (paid vehicle rental to a third party).

In such an example of the application, since the user pays the fee to the owner, it is easy for those skilled in the art to understand that the settlement server 500 in FIG. 1 is not needed and the configuration of the system is appropriately changed. Therefore, detailed description of the system configuration will be omitted.

In this example of the application, the electronic key lent to the user may be invalidated solely on condition that return of the vehicle 100 to the return position has been performed.

Further, the electronic key may be invalidated on condition that an explicit expression of an intention of early return is performed by the user. The expression of intention of the early return may be performed by the user notifying the key management server 400 or another server device of the expression of intention via the user device. Rental of a vehicle is generally performed with a limited time, but users may desire to return the vehicle before a return deadline. It is effective to enable the early return in such cases. For example, by giving incentives such as reduction in a use fee or addition of points with respect to the early return, promotion of use, reliable return to the return deadline, and the like can be expected.

Modification Example 4

In the above embodiment, the key unit 110 is interposed between the user device (dealer terminal 200) and the collation unit 130. However, the user device may directly control the vehicle by performing wireless communication with the collation unit 130.

Modification Example 5

Although a control target using the electronic key is a vehicle in the above description, the control target may be any device as long as the device is movable (including being carried) and whether or not to the device is available can be controlled using the electronic key. Examples of such a device may include a robot, an airplane (including an unmanned aerial vehicle), a ship, and a computer.

Although the embodiments of the present disclosure have been described in detail above, applicable embodiment of the present disclosure is not limited to the above-described embodiments, and various modifications or changes may be made within the scope of the gist of the present disclosure described in above.

What is claimed is:

1. A key management device comprising:
a server configured to:
issue an electronic key of a vehicle to a user device,
acquire position information of the vehicle, and
invalidate the electronic key issued to the user device when a determination is made from the position information of the vehicle that the vehicle is present at a predetermined position and a predetermined process of a user by the user device has been completed,
wherein the predetermined position is a predetermined return position of the vehicle, and
wherein the predetermined process is a settlement process between an owner of the vehicle and a maintenance dealer who performs maintenance on the vehicle.

2. The key management device according to claim 1, wherein the settlement process includes payment by the owner to the maintenance dealer.

3. A vehicle rental system comprising:
a vehicle;
a user device; and
a key management device configured to issue an electronic key of the vehicle to the user device, wherein
the key management device includes a server configured to
issue the electronic key of the vehicle to the user device,
acquire position information of the vehicle, and
invalidate the electronic key issued to the user device when a determination is made from the position information of the vehicle that the vehicle is present at a predetermined position and a predetermined process of a user by the user device has been completed, and
the predetermined position is a predetermined return position of the vehicle,
wherein the predetermined process is a settlement process between an owner of the vehicle and a maintenance dealer who performs maintenance on the vehicle.

4. A key management method performed by a key management device including a server, the key management method comprising:
issuing, by the server, an electronic key of a vehicle to a user device;
acquiring, by the server, position information of the vehicle; and
invalidating, by the server, the electronic key issued to the user device when a determination is made from the position information of the vehicle that the vehicle is present at a predetermined position and a predetermined process of a user by the user device has been completed,
wherein the predetermined position is a predetermined return position of the vehicle, and
wherein the predetermined process is a settlement process between an owner of the vehicle and a maintenance dealer who performs maintenance on the vehicle.

5. A non-transitory computer-readable recording medium storing a program for causing a computer to execute a key management method performed by a key management device including a server, the program causing a control process of the key management device to be executed, the control process comprising:
issuing, by the server, an electronic key of a vehicle to a user device;
acquiring, by the server, position information of the vehicle, and
invalidating, by the server, the electronic key issued to the user device when a determination is made from the position information of the vehicle that the vehicle is present at a predetermined position and a predetermined process of a user by the user device has been completed,
wherein the predetermined position is a predetermined return position of the vehicle, and
wherein the predetermined process is a settlement process between an owner of the vehicle and a maintenance dealer who performs maintenance on the vehicle.

* * * * *